May 24, 1927.  
E. GEIGER  
1,629,572  
ROTATING ENDLESS SCREEN BELT FOR THE MECHANICAL PURIFICATION OF WATER  
Filed March 25, 1926   2 Sheets-Sheet 2

INVENTOR

Patented May 24, 1927.

UNITED STATES PATENT OFFICE.

EUGEN GEIGER, OF KARLSRUHE, GERMANY.

ROTATING ENDLESS SCREEN BELT FOR THE MECHANICAL PURIFICATION OF WATER.

Application filed March 25, 1926, Serial No. 97,395, and in Germany April 2, 1925.

My invention relates to screens for mechanically purifying river or waste water, which are in the form of an endless belt composed of a number of sections of screen held in frames and rotated by two endless chains which are disposed one at each side and which are guided in two U-shaped rails mounted on the side walls of the water channel by means of rollers that are mounted on pins formed by the ends of the bolts connecting the chain links, the chains being driven above the water by two wheels mounted upon a common shaft and provided with a number of peripheral gaps engaged by the guiding rollers running over them.

The invention especially relates to screen belts of that kind in which the said frames are pivotally suspended from the chain bolts and, in order to scrape off floating and suspended substances lifted out of the water by means of transverse bars provided at the pivoted end of the frames and to throw these substances into a trough arranged in front of the upper portion of the front part of the belt by means of the frames, these are caused to swing out forwards and after said operation allowed to swing back.

In known screen belts of this kind the sliding friction of the guiding rollers in the gaps of the chain wheels acts to check the rotation of the chain bolts so as to impede the said movement of the frames. To avoid this, according to my invention the chain wheels are provided at their gaps, which are correspondingly enlarged, with bearing rollers projecting into the gaps so that the guiding rollers of the belt engaging with the gaps come to rest upon said bearing rollers and consequently run over the chain wheels no longer with sliding but with rolling friction, thus securing an easy movement of the frames as well as an easy and quiet running of the belt.

Figure 1:
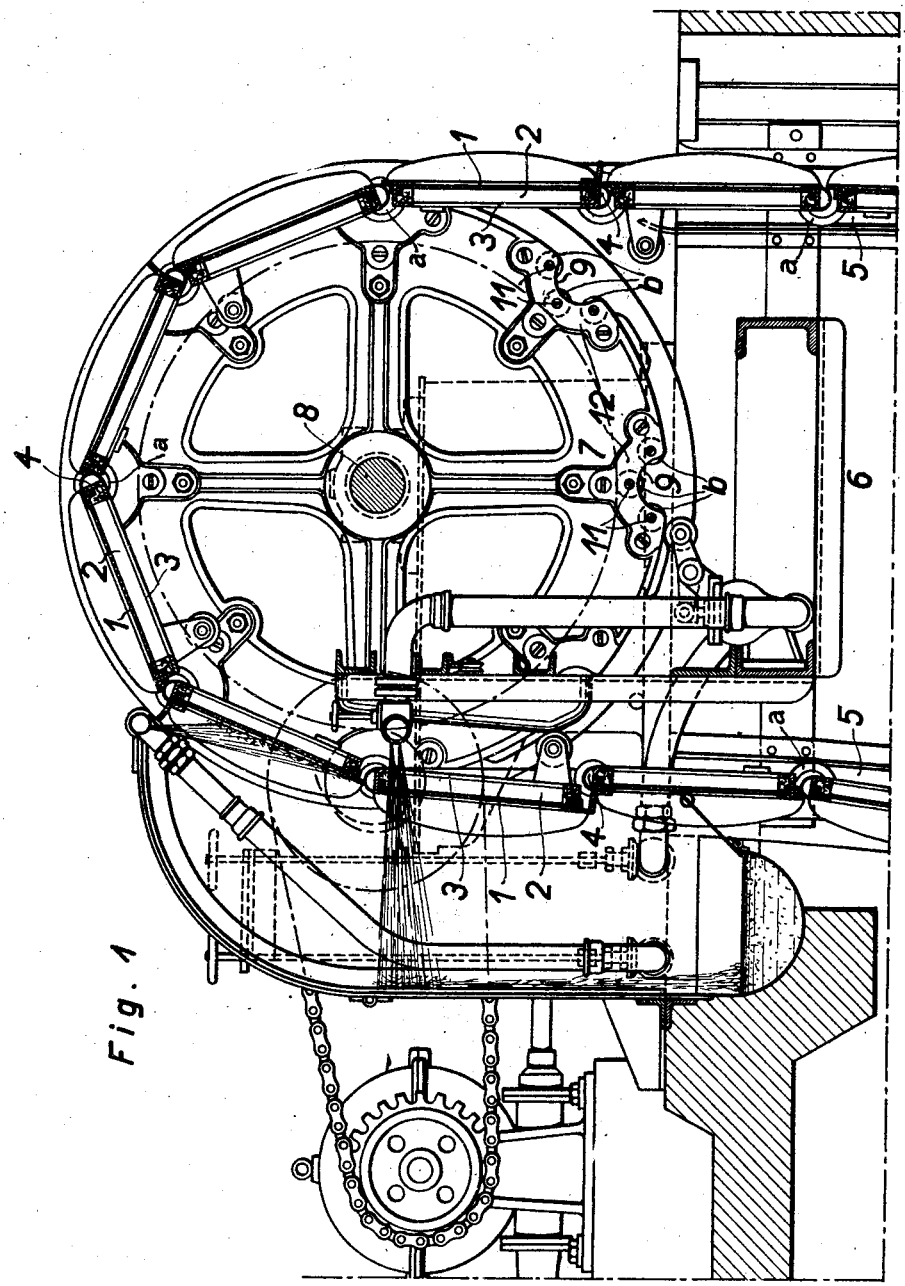
Figure 2:
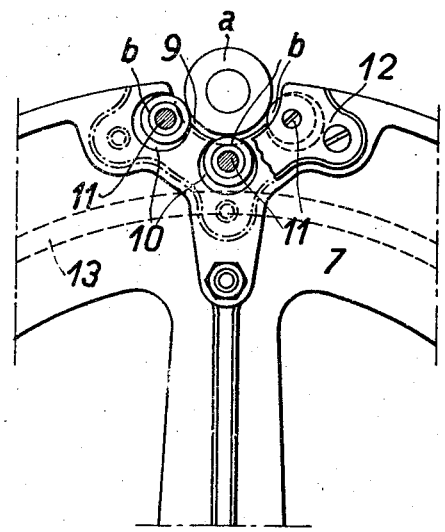
Figure 3:
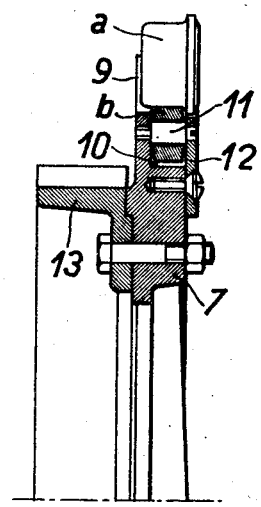

In the accompanying drawings Fig. 1 shows the upper part of an endless screen belt in vertical section with a chain wheel embodying my invention in side elevation, and Figs. 2 and 3 show a part of the chain wheel with a guiding roller engaging therewith on a larger scale in side elevation and in cross section respectively.

The endless screen belt, Fig. 1, is composed of a number of screen sections 1 which are held in frames 2. These frames are carried by two endless chains 3 which are disposed on both sides of the belt. The links of these chains are connected together by horizontal bolts 4 both ends of which form a bearing pin carrying a roller $a$. The chains 3 are by means of these rollers guided in two U-shaped rails 5 mounted on the side walls 6 of the water channel and are driven above the water by two chain wheels 7 mounted upon a common shaft 8. The rim of these wheels is provided at its periphery with a number of semi-circular gaps 9 engaged by the rollers $a$ running over the wheel.

Furthermore, the rim of the chain wheels 7 has adjacent to each gap 9 three smaller circular gaps 10 the centers of which lie on a circle concentric with the gap 9. In each gap 10 there is a roller $b$ rotatably mounted on a bolt 11. These bolts rest at one end in the rim of the wheel 7 and at the other end in a plate 12 secured to the inner face of the rim by means of screws. The rollers $b$ project somewhat into the gap 9 the radius of which is somewhat larger than that of the roller $a$ so that the latter in engaging with the gap 9 comes to rest upon the rollers $b$ at a corresponding distance from the face of the gap.

On the outer face of the rim of the wheel 7 there is secured by means of screw bolts a spur gear rim 13 serving for the drive of the belt.

What I claim as my invention and desire to secure by Letters Patent is:

1. In a rotating endless screen belt for the mechanical purification of water, in combination with two endless chains carrying said belt and guiding rollers on both sides and running over two chain wheels mounted above the water, a number of gaps provided in the periphery of the rim of said chain wheels for the engagement of said guiding rollers, the radius of said gaps being somewhat larger than that of said rollers, and a number of bearing rollers rotatably mounted in the rim of said chain wheels adjacent to each of said gaps and with their periphery somewhat projecting into the respective gap so that said guiding rollers in engaging with said gaps come to rest upon said bearing rollers at a certain distance from the face of the respective gap.

2. In a rotating endless screen belt for the mechanical purification of water, in combination with two endless chains carrying said belt and guiding rollers on both sides and running over two chain wheels mounted above the water, a number of gaps provided in the periphery of the rim of said chain wheels for the engagement of said guiding rollers, the radius of said gaps being somewhat larger than that of said rollers, a number of further gaps provided in the rim of said chain wheels adjacent to each of the first said gaps, and a number of bearing rollers one of which being rotatably mounted in each of said further gaps so that its periphery projects somewhat into the respective first said gap and that said guiding rollers in engaging with the first said gaps come to rest upon said bearing rollers at a certain distance from the face of the respective gap.

3. In a rotating endless screen belt for the mechanical purification of water, in combination with two endless chains carrying said belt and guiding rollers on both sides and running over two chain wheels mounted above the water, a number of gaps provided in the periphery of the rim of said chain wheels for the engagement of said guiding rollers, the radius of said gaps being somewhat larger than that of said rollers, a number of further gaps provided in the rim of said chain wheels adjacent to each of the first said gaps, a number of plates secured to the rim of said chain wheels adjacent to each of the first said gaps and laterally closing the respective further gaps, a number of further bolts extending through said gaps and resting in the rim of said chain wheels and in said plates, and a number of bearing rollers one of which being rotatably mounted in each of said gaps upon the respective further bolt so that its periphery projects somewhat into the respective first said gap and that said guiding rollers in engaging with the first said gaps come to rest upon said bearing rollers at a certain distance from the face of the respective gap.

In testimony whereof I affix my signature.

Dr. EUGEN GEIGER.